May 8, 1934.　　　　A. SZEGVARI　　　　1,958,118
METHOD AND APPARATUS FOR HOMOGENIZING AQUEOUS DISPERSIONS
Filed July 18, 1927
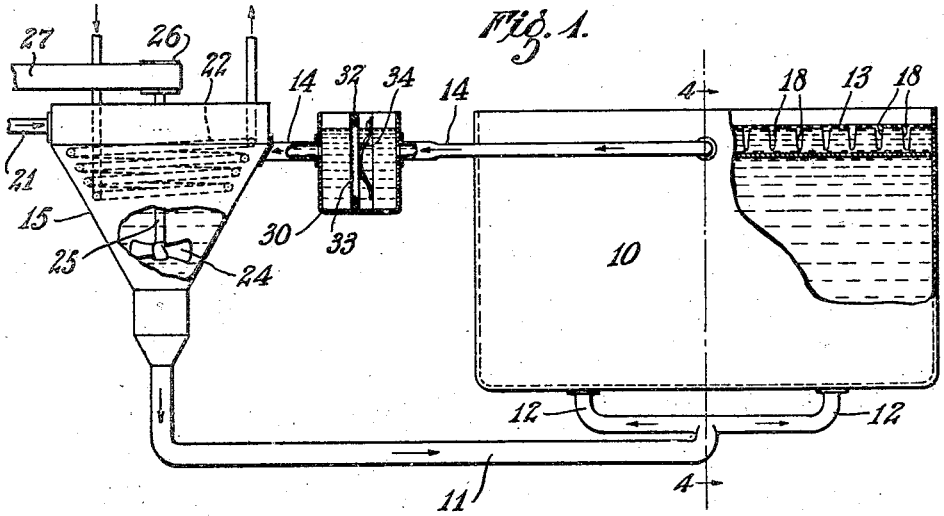
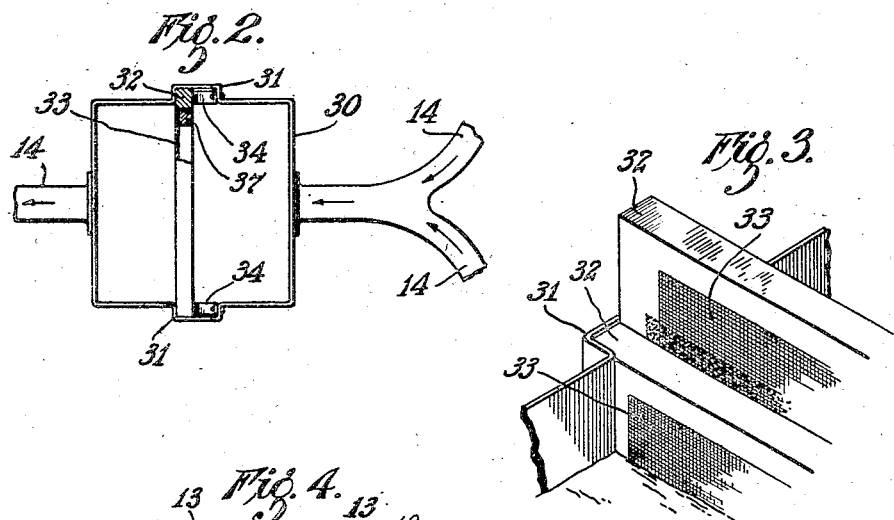
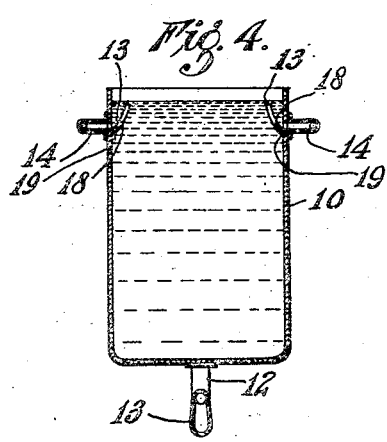
Inventor,
Andrew Szegvari
By Pierson, Eakin & Avery
Attys Patented May 8, 1934

1,958,118

UNITED STATES PATENT OFFICE 1,958,118

METHOD AND APPARATUS FOR HOMOGENIZING AQUEOUS DISPERSIONS

Andrew Szegvari, Akron, Ohio, assignor, by mesne assignments, to American Anode Inc., Akron, Ohio, a corporation of Delaware Application July 18, 1927, Serial No. 206,553

6 Claims. (Cl. 91—57)

This invention relates to the continuous treatment of aqueous dispersions of mixed materials of a character employed in various manufacturing operations, and has for an object to provide a method for maintaining the dispersed particles uniformly in suspension in the aqueous medium and to remove from the aqueous medium promptly upon formation dispersed particles larger than a predetermined size, and further to provide an apparatus for carrying out such method.

Certain industrial operations call for the dipping of objects into aqueous dispersions of mixed materials, that is, compositions in which materials in very small particles are suspended in aqueous media, and of which compositions natural or artificial aqueous dispersions of rubber, either or not containing compounding and vulcanizing agents, are typical. Aqueous dispersions of this character commonly exhibit a tendency for the lighter particles to rise to the top, called creaming, and for heavier particles to settle to the bottom, referred to as sedimentation. Further particles in suspension frequently exhibit a tendency to agglomerate without forming perceptible conglomerates and in certain cases clotting of particles may take place. Where these tendencies, however slight, are permitted to act unimpeded, or where they are accelerated by repeated dipping of bodies into the aqueous dispersion, or by heating the dispersion incidental to the operation, or by utilizing the dispersion at even moderately high temperatures, the aqueous dispersion loses to an appreciable degree in a very short time its original homogeneity in the distribution and size of the suspended particles and produces inferior or defective coatings or layers of the suspended matter on the bodies being processed by immersion in the dispersion.

The purpose of the present invention is to remedy these defects inherent in processes utilizing aqueous dispersion. This is accomplished by a number of cooperative steps and mechanisms. First, a slow but continuous circulation of the dispersion is maintained through the processing chamber, minimizing sedimentation, the dispersion being withdrawn continuously from the chamber at and immediately below the surface of the dispersion to remove foam and floating agglomerates at or near the surface, thus preventing creaming of the dispersion. Secondly, the dispersion removed from the processing chamber is subjected to a filtering action to remove all over-size particles or scum produced by agglomeration, or other causes, in the processing chamber. Third, provision is made for modifying the temperature of the filtered dispersion and for returning it in a uniformly dispersed homogeneous condition back into the processing chamber. The effect of these various steps is to maintain the homogeneity of the dispersion, both as to the uniformity of distribution of particles and as to the maximum size of the dispersed particles, as well as to maintain a substantially uniform temperature of the dispersion in the processing chamber.

In the accompanying drawing, apparatus is shown suitable for carrying out my invention, which apparatus, it will be understood, is merely representative of a simple embodiment illustrative of the principles of the invention. Fig. 1 is a view partly in section and partly in elevation of an apparatus embodying my invention; Fig. 2 is a plan view of the filtration chamber, the filter being in part broken away; Fig. 3 is a fragmentary view in perspective of the filtration chamber showing a method of removing the filter members; and Fig. 4 is a sectional detail of the processing chamber on line 4—4 of Fig. 1.

In the embodiment illustrated in the drawing, the apparatus consists of a processing chamber 10 which is shown as a rectangular tank open at the top, although obviously it may be of any desired shape and proportions. The processing chamber 10 is supplied with an aqueous dispersion of a composition suitable for the process for which the apparatus is to be used by means of a pipe 11 which is divided into two or more branches 12 in such manner as to deliver the aqueous dispersion more or less uniformly into a lower portion of the chamber 10. The aqueous dispersion is withdrawn from the chamber 10 through an overflow conduit 13 and pipes 14 which lead to a mixing and tempering reservoir 15 disposed without but adjacent to the chamber 10 and in such position that the liquid levels in the chamber 10 and reservor 15 are substantially the same. As shown, the pipe 11 leads from the bottom of the reservoir 15 so that a complete circulatory path for the flow of the aqueous dispersion from the chamber 10 through conduits 13, pipes 14, reservoir 15 and pipe 11, back to the chamber 10 is provided.

The overflow conduit 13 is shown in the drawing in the form of a gutter extending along the sides of the chamber 10, the conduit being provided with vertically extending slits 18 so as to withdraw the liquid from the tank 10 not only at the surface but also from immediately below the surface. This construction is particularly effective in eliminating the tendency of the dispersion to cream, such particles as tend to float on or near the surface being withdrawn into the overflow conduit 13. As shown, the conduit 13 is in the form of a plate attached to the wall of the chamber 10 at 19 in any suitable manner, as by riveting or welding.

The mixing reservoir 15 is disclosed as a funnel shaped tank broad at the top and converging toward the bottom where it merges into the pipe 11, the design being such that the liquid dispersion may pass from the reservoir 15 to the pipe 11 with a smooth stream-line flow. The reservoir 15 functions to supply the processing chamber 10 with the aqueous dispersion in a suitable processing condition and it is to this reservoir that necessary additional quantities of the aqueuos dispersion enter the circulatory system, as through an inlet conduit 21 where they mingle with the dispersion returned to the reservoir 15 through the pipe 14. Heat exchanger coils 22 immersed in the liquid within the reservoir 15 are adapted to maintain the temperature of the liquid therein at the degree desired for carrying out the process. It is obvious that either a hot or cold fluid medium may be circulated through the coils 22 to impart the desired temperature conditions to the circulating liquid. A propeller 24, supported on a vertically extending shaft 25, is also disposed in the reservoir 15 and is operated from any suitable source of power, as by a pulley 26 and a belt 27. The propeller 24 may be of any suitable construction but should preferably be so operated and designed as to cause a thorough admixture of the liquid dispersion in the reservoir 15 and a slow movement thereof into the pipe 11.

The apparatus hereinabove described is particularly adapted for and is intended for use in connection with processes employing liquid dispersions of mixed materials, such as natural or artificial aqueous dispersions of rubber whether or not containing compounding and vulcanizing ingredients, and in which dispersions the particles to a greater or less extent agglomerate during the carrying out of the processes in the chamber 10. These agglomerates are of larger particle size than is desired for the processes to be carried out in the chamber 10 and should be promptly removed from the dispersion, since their incorporation in the coatings or layers deposited on the objects being treated will impair its homogeneity. For this reason, I interpose in either the return pipe 14 or in the delivery pipe 11 a filtering device to remove from the liquid these agglomerate particles which exceed a certain particle size.

As shown in the drawing, I provide in the pipe 14 a filter, which may be any suitable type of continuous filtering device, and in the embodiment illustrated comprises a box 30, preferably open at the top and disposed to contain the liquid dispersion at substantially the level of the chamber 10 and reservoir 15. The box is provided at its opposite sides with channel members 31 in which filter frames, such as the filter frame 32, supporting a filter medium 33, are adapted to be slid, the frames being held against a to and fro movement in the channel members by means of the springs 34. As shown, the filter medium 33 is removably supported in the frame 32 by means of an inner frame 37, the arrangement being such that the filter medium 33 may be replaced from time to time as required. In order to provide for the removal from the filter box 30 of a clogged filter, or filter on which considerable material has been collected, and at the same time to insure the continuous filtration of the liquid and the prevention of large particles from entering into the reservoir 15, the channel members 31 are made of sufficient breadth to accommodate two frames side by side, a clean frame 32 being inserted in place in the channel members 31 before the used filter is withdrawn, as indicated in Fig. 3 of the drawing.

The operation of this apparatus is readily apparent from the description hereinabove given. Briefly, the processing chamber 10, reservoir 15 and connecting pipes 11 and 14 are filled to the desired level with a suitable liquid dispersion, such as a natural or artificial dispersion of rubber, by introducing the dispersion through the pipe 21 into the reservoir 15 and circulating it therethrough by means of the propeller 24. When the apparatus has been filled with the liquid dispersion and the circulation established, objects of various types may be placed for treatment in the processing chamber 10. For example, fabrics may be dipped into the liquid dispersion of the chamber 10, or other articles to be impregnated may be dipped into the liquid dispersion, or articles of wood, metal or other solid materials to be coated may be dipped into the dispersion. In other cases, it may be desired to deposit the materials of the liquid dispersion upon an article by electrophoresis, in which situation suitable electrodes are provided in the tank 10 and the process carried out in the well known manner described in the Patents Nos. 1,476,374 and 1,548,689. It is to be understood, however, that the particular use made of the liquid dispersion in the processing tank, whether for impregnation, coating or electrodeposition, forms no part per se of the present invention.

The immersion of the articles into and out of the liquid in the chamber 10 gives rise to a certain extent to foaming and scum formations and frequently occasions an agglomeration of the particles of the dispersion to form particles of a size larger than is desired for the processes being carried out in the chamber 10. Since the liquid dispersion is continuously circulating through the chamber 10, the heavier particles of the dispersion are deterred from settling out and the agglomerated or larger particles are carried toward the overflow or the outlet conduit 13, the slits 18 extending a considerable distance below the surface permitting such enlarged particles as may form in the dispersion to be carried from beneath the surface of the liquid into the conduit 13. The liquid dispersion then pass through the conduits 14 to the filter box 30 where the large particles, scum, dirt and the like are removed from the liquid dispersion which then passes to the reservoir 15.

When the processing chamber 10 is being continually employed it is necessary to supply to the circulating system continuously or at frequent intervals, additional quantities of the liquid dispersion. These may preferably enter the reservoir 15 through the conduit 21 and mingle with the filtered liquid dispersions entering the reservoir 15 from the filter box 30. Generally it is desirable to maintain liquid dispersions at a relatively low temperature or at least to prevent the temperature from exceeding a predetermined degree. This is particularly important where the process carried out in the chamber 10 is one of electrodeposition of materials from aqueous dispersions since the process itself tends to heat the liquid dispersion and the dispersion agglomerates more readily when in a heated condition.

For this reason, when such a process is being employed, a cooling medium is passed through the coils 22, the temperature of which may be controlled to meet the conditions required. It will also be obvious where it is desirable to utilize the liquid dispersion at an elevated temperature, a heated fluid may be passed through the coils 22 to secure any desired temperature of the liquid in the circulatory system.

The movement of the liquid through the circulatory system of the present apparatus should be relatively slow and the apparatus should preferably be designed so as to provide a relatively smooth stream line flow for the liquid throughout the system, since sharp turns in the liquid as it flows through the system or violent impacts of the liquid against the walls thereof augment the agglomeration of the materials dispersed in the liquid. The low speed propeller 24 and the convergent outlet portion of the reservoir 15 are designed to effect such a smooth stream line flow.

While the invention of this application has been described in connection with a single apparatus, it is to be understood that numerous variations and modifications thereof may be made without departing from the principles of the invention, and I therefore do not desire to restrict the scope of this invention to any particular apparatus or in other respects than it is limited in the claims herein appended.

I claim:

1. The method of maintaining the homogeneity of a coagulable aqueous dispersion of mixed materials in a processing chamber which comprises causing the dispersion to flow slowly into the chamber and to pass slowly therethrough, withdrawing the dispersion from the chamber at and near the surface level thereof, subjecting the dispersion thus withdrawn to a filtering action, admixing fresh supplies of the liquid dispersion to the filtered dispersion, modifying the temperature of the admixed dispersion to bring it to a desired operating temperature, and returning the dispersion thus treated back into the bottom of the chamber.

2. The method of maintaining the homogeneity of a coagulable aqueous dispersion of mixed materials in a processing chamber which comprises causing the dispersion to flow slowly and continuously out of the chamber near the surface of the liquid, subjecting the dispersion thus withdrawn to a filtering action, modifying the temperature of the filtered dispersion to bring it to a desired operating temperature, and returning the dispersion thus treated back into the bottom of the chamber.

3. In an apparatus of the class described, in combination, a processing chamber having a multiple inlet and a multiple outlet disposed respectively at the bottom of the chamber and adjacent to the surface of the liquid, a reservoir disposed on a level with said chamber, conduits for conducting liquid from the chamber to the reservoir and from the reservoir to the chamber, means disposed in one of said conduits for filtering said liquid, means in said reservoir for modifying the temperature of the liquid, and means for circulating the liquid to and from the chamber and reservoir.

4. In an apparatus of the class described, in combination, a processing chamber having a multiple inlet at the bottom and a multiple outlet near the top, a reservoir disposed on a level with said chamber, conduits for conducting liquid from the chamber to the reservoir and from the reservoir to the chamber, means disposed in one of said conduits for filtering said liquid, means for admixing fresh supplies of liquid with the liquid of the reservoir, means in said reservoir for modifying the temperature of the liquid, and means for circulating the liquid to and from the chamber and reservoir.

5. In an apparatus of the class described, in combination, a processing chamber having an inlet at the bottom, an overflow gutter adjacent to at least a portion of the upper edge of the chamber, the wall separating the chamber and the gutter being provided with a plurality of vertical slits wider at the top than at the bottom, means for filtering the liquid flowing into the gutter, and means for returning the filtered liquid to the inlet of the chamber.

6. In an apparatus of the class described, in combination, a processing chamber having an inlet at the bottom, an overflow gutter adjacent to a substantial portion of the upper edge of the chamber, the wall separating the chamber and the gutter being provided with a plurality of substantially uniformly spaced vertical slits wider at the top than at the bottom, means for filtering the liquid flowing into the gutter, and means for returning the filtered liquid to the inlet of the chamber at a substantially constant rate.

ANDREW SZEGVARI.